US012525181B2

(12) United States Patent
Yoo et al.

(10) Patent No.: US 12,525,181 B2
(45) Date of Patent: Jan. 13, 2026

(54) DRIVING CONTROLLER AND DISPLAY DEVICE INCLUDING THE SAME

(71) Applicant: Samsung Display Co., LTD., Yongin-si (KR)

(72) Inventors: Hyunseuk Yoo, Yongin-si (KR); Ohjo Kwon, Yongin-si (KR); Myungwoo Lee, Yongin-si (KR); Wonhee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 21 days.

(21) Appl. No.: 18/603,993

(22) Filed: Mar. 13, 2024

(65) Prior Publication Data

US 2024/0363062 A1 Oct. 31, 2024

(30) Foreign Application Priority Data

Apr. 28, 2023 (KR) ........................ 10-2023-0056023

(51) Int. Cl.
*G09G 3/00* (2006.01)
*G09G 3/3208* (2016.01)

(52) U.S. Cl.
CPC ........... *G09G 3/3208* (2013.01); *G09G 3/001* (2013.01); *G09G 2320/0233* (2013.01); *G09G 2360/16* (2013.01)

(58) Field of Classification Search
CPC ....... G09G 2320/0233; G09G 2360/16; G09G 3/001; G09G 3/3208; G09G 3/3233
See application file for complete search history.

(56) References Cited

U.S. PATENT DOCUMENTS

| | | | | |
|---|---|---|---|---|
| 10,785,465 B2 | 9/2020 | Yoo et al. | | |
| 2023/0017188 A1* | 1/2023 | He | ........................ | G01S 7/4802 |
| 2023/0044063 A1* | 2/2023 | Peng | .................... | G09G 3/2011 |
| 2023/0298524 A1* | 9/2023 | Cho | ..................... | G09G 3/3233 345/691 |

FOREIGN PATENT DOCUMENTS

| | | |
|---|---|---|
| KR | 1020180039224 A | 4/2018 |
| KR | 1020200095985 A | 8/2020 |

* cited by examiner

*Primary Examiner* — Insa Sadio
(74) *Attorney, Agent, or Firm* — CANTOR COLBURN LLP

(57) ABSTRACT

A display device includes a display panel including a plurality of pixels and that displays an image in a display area, and a driving controller which receives an image signal, drives the plurality of pixels, where the driving controller includes a compensation unit, and the plurality of pixels include a first pixel disposed in a central area of the display area and a second pixel spaced apart from the central area by a preset distance, the compensation unit outputs compensation data for controlling luminance of the image, and the display panel displays the image, in which a first luminance of the first pixel is less than a second luminance of the second pixel with respect to a same luminance value, based on the compensation data.

20 Claims, 7 Drawing Sheets

DRIVING CONTROLLER AND DISPLAY DEVICE INCLUDING THE SAME

This application claims priority to Korean Patent Application No. 10-2023-0056023, filed on Apr. 28, 2023, and all the benefits accruing therefrom under 35 U.S.C. § 119, the content of which in its entirety is herein incorporated by reference.

BACKGROUND

1. Field

Embodiments of the disclosure described herein relate to a drive controller with improved display quality and a display device including the drive controller.

2. Description of the Related Art

A head mounted device is a device wearable on the head and may be used as a media device that provides an augmented reality or a virtual reality to a user. The head mounted device for realizing the augmented reality may provide a virtual image through a display device. In this case, the user may simultaneously perceive a virtual image and a real object. To implement the virtual reality, the head mounted device may include a display panel and a lens unit.

SUMMARY

Embodiments of the disclosure provide a drive controller with improved display quality and a display device including the drive controller.

According to an embodiment of the disclosure, a display device includes a display panel including a plurality of pixels, where the display panel displays an image in a display area, and a driving controller which receives an image signal and drives the plurality of pixels, where the driving controller includes a compensation unit, and the plurality of pixels include a first pixel disposed in a central area of the display area and a second pixel spaced apart from the central area by a preset distance, the compensation unit outputs compensation data for controlling luminance of the image, and the display panel displays the image, in which a first luminance of the first pixel is less than a second luminance of the second pixel with respect to a same luminance value, based on the compensation data.

According to an embodiment, the display device may further include a lens unit facing the display panel, wherein the image may be provided to a user through the lens unit.

According to an embodiment, the lens unit may include a pancake lens.

According to an embodiment, the compensation unit may include a distance calculator which calculates a distance value between two pixel coordinates, a compensation value calculator which outputs a compensation value for each of the plurality of pixels based on a lookup table provided with a compensation value for each distance value, and a compensation data output unit which outputs the compensation data based on image data, which is obtained by converting the image signal, and the compensation value.

According to an embodiment, the display device may further include a memory in which the lookup table is stored.

According to an embodiment, the distance calculator may calculate the distance value based on preset center coordinates of the display area and pixel coordinates of one of the plurality of pixels.

According to an embodiment, the distance calculator may calculate the distance value based on the following equation: $D=\sqrt{(L_x-P_x)_2+(L_y-P_y)_2}$, where the distance value is denoted by D, the center coordinates are denoted by Lx and Ly, and the pixel coordinates are denoted by Px and Py.

According to an embodiment, the distance calculator may calculate the distance value based on the following equation: $D=(L_x-P_x)_2+(L_y-P_y)_2$, where the distance value is denoted by D, the center coordinates are denoted by Lx and Ly, and the pixel coordinates are Px and Py.

According to an embodiment, the compensation value may be provided in plurality, and the distance value may be provided in plurality, the plurality of distance values and the plurality of compensation values respectively corresponding to the plurality of distance values may be included in the lookup table, the plurality of distance values may be an arithmetic sequence with a tolerance, and the plurality of compensation values may increase as the plurality of distance values increase.

According to an embodiment, when the distance value calculated by the distance calculator does not correspond to one of the plurality of distance values in the lookup table, the compensation value calculator may calculate the interpolation compensation value using an interpolation method.

According to an embodiment, the interpolation method may include a linear interpolation method.

According to an embodiment, the linear interpolation method may calculate the interpolation compensation value based on the following equation:

$$Q = Q_1 * \frac{D_2 - D}{D_2 - D_1} + Q_2 * \frac{D - D_1}{D_2 - D_1},$$

where the distance value calculated by the distance calculator is denoted by 'D', the interpolation compensation value is denoted by 'Q', a first distance value less than the distance value calculated by the distance calculator among the plurality of distance values is denoted by $D_1$, a second distance value greater than the distance value calculated by the distance calculator among the plurality of distance values is denoted by $D_2$, a first compensation value of the first distance value is denoted by $Q_1$, and a second compensation value of the second distance value is denoted by $Q_2$.

According to an embodiment, the interpolation method may include a Lagrange interpolation method.

According to an embodiment, the Lagrange interpolation method may calculate the interpolation compensation value based on the following equation:

$$Q = Q_1 * \frac{D_2 - D}{d} * \frac{D_3 - D}{2d} + Q_2 * \frac{D - D_1}{d} * \frac{D_3 - D}{d} + Q_3 * \frac{D - D_1}{2d} * \frac{D - D_2}{d},$$

where the distance value calculated by the distance calculator is denoted by 'D', the interpolation compensation value is denoted by 'Q', a first distance value, which is one of the plurality of distance values, is denoted by $D_1$, a second distance value, which is another one of the plurality of distance values, is denoted by $D_2$, a third distance value, which is another one of the plurality of distance values, is denoted by $D_3$, a first compensation value of the first distance value is denoted by $Q_1$, a second compensation value of the second distance value is denoted by $Q_2$, a third compensation value of the third distance value is denoted by $Q_3$, and the tolerance is denoted by 'd'.

According to an embodiment, the tolerance may be an n-th power of two, where 'n' is a natural number.

According to an embodiment, the compensation data output unit may calculate the compensation data by multiplying the compensation value corresponding to the image data of each of the plurality of pixels or the interpolation compensation value by the image data.

According to an embodiment of the disclosure, a driving controller for receiving an image signal and driving a plurality of pixels of a display panel includes a compensation unit, and the compensation unit includes a distance calculator which calculates a distance value between two pixel coordinates, a compensation value calculator which outputs a compensation value for each of the plurality of pixels based on a lookup table provided with a compensation value for each distance value, and a compensation data output unit which outputs compensation data based on image data, which is obtained by converting the image signal, and the compensation value.

According to an embodiment, the distance may calculate the distance value based on preset center coordinates and pixel coordinates of one of the plurality of pixels.

According to an embodiment, the compensation value may be provided in plurality, and the distance value may be provided in plurality, the plurality of distance values and the plurality of compensation values respectively corresponding to the plurality of distance values may be included in the lookup table, the plurality of distance values may be an arithmetic sequence with a tolerance, and the plurality of compensation values may increase as the plurality of distance values increase.

According to an embodiment, when the distance value calculated by the distance calculator does not correspond to one of the plurality of distance values in the lookup table, the compensation value calculator may calculate the interpolation compensation value using an interpolation method, and the compensation data output unit may calculate the compensation data by multiplying the compensation value corresponding to the image data of each of the plurality of pixels or the interpolation compensation value by the image data.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
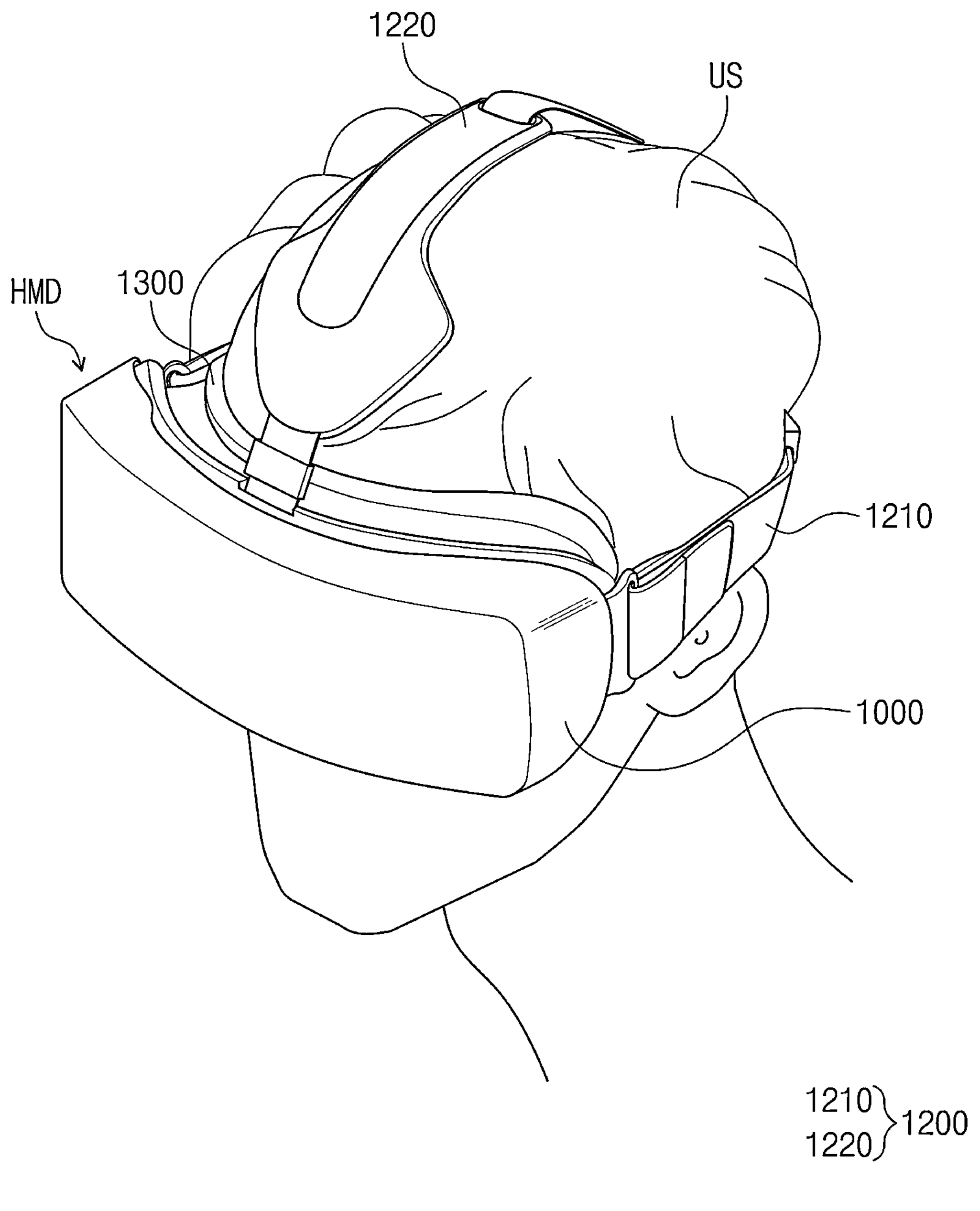
FIG. 1 is a perspective view illustrating a head mounted device including a display device worn by a user, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents.

The terms "first", "second", etc. are used to describe various components, but the components are not limited by the terms. The terms are used only to differentiate one component from another component. For example, a first component may be named as a second component, and vice versa, without departing from the spirit or scope of the disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the disclosure.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the accompanying drawings.

FIG. 1 is a perspective view illustrating a head mounted device including a display device worn by a user, according to an embodiment of the disclosure.

Referring to FIG. 1, an embodiment of a display device 1000 may be provided to a user in various forms. For example, the display device 1000 may be a wearable device to provide an image to a user. For example, the display device 1000 may have a form such as a head mounted display worn on a user's head or a glasses-type display worn by the user like glasses. In FIG. 1, a state in which the user US wears a head mounted device HMD is illustrated as an example.

The display device 1000 may be a display device for implementing a virtual reality (VR) or an augmented reality (AR). For example, the display device 1000 may provide an image of a virtual world different from the real world perceived by the user, or may provide a real world image perceived by the user and virtual images or information. The display device 1000 may provide a user US with an image of a virtual world different from the real world in which the user US exists.

The head mounted device HMD may include a display device 1000, a wearable part 1200, and a cushion part 1300. The display device 1000 may cover the eyes of the user US to correspond to the left and right eyes of the user US.

The head mounted device HMD may provide a second image IM2 (refer to FIG. 2) to the user US through the display device 1000 in a state in which the peripheral vision with respect to the actual reality of the user US is blocked. The user US wearing the head mounted device HMD may be more easily immersed in the virtual reality through the display device 1000.

The wearable part 1200 may be combined with the display device 1000 such that the display device 1000 can be easily worn by the user US. In an embodiment, as shown in FIG. 1, for example, the wearable part 1200 may include a main strap 1210 worn around the head of the user US and an upper strap 1220 connecting the display device 1000 to the main strap 1210 along the top of the head of the user US.

The main strap 1210 may be fixed such that the display device 1000 can be closely attached to the head of the user US. The upper strap 1220 may prevent the display device 1000 from slipping down, and may further improve the wearing comfort of the user US by distributing the weight of the display device 1000.

In FIG. 1, an embodiment where the main strap 1210 and the upper strap 1220 in a form in which each length can be adjusted is illustrated by way of example, but is not limited thereto. In an alternative embodiment, for example, the main strap 1210 and the upper strap 1220 may not have a portion for adjusting the length, and may be in the form of elastic strings.

As long as the display device 1000 can be fixed to the user US, the wearable part 1200 may be deformed into various shapes other than the shape illustrated in FIG. 1. In an alternative embodiment, for example, the upper strap 1220 may be omitted. Also, in some embodiments of the disclosure, the wearable part 1200 may be modified into various shapes, such as in the form of a helmet combined with the display device 1000 or in the form of a pair of temples combined with the display device 1000.

The cushion part 1300 may be disposed to closely adhere to the face of the user US when the head mounted device HMD is worn. The cushion part 1300 may be freely deformed and may absorb impact applied to the head mounted device HMD. In an embodiment, for example, the cushion part 1300 may be a polymer resin or foam sponge, and may include polyurethane, polycarbonate, polypropylene, or polyethylene. However, the material of the cushion part 1300 is not limited to the above examples. Alternatively, the cushion part 1300 may be omitted.

Figure 2:
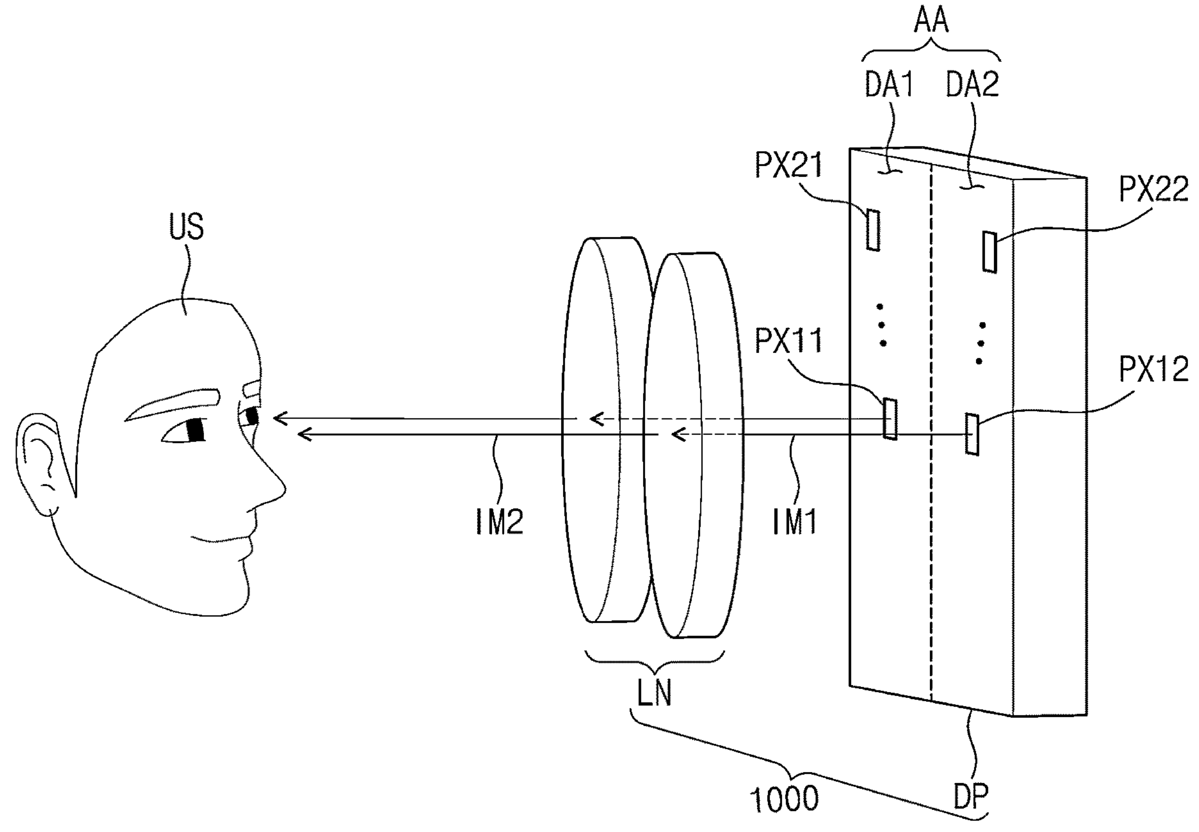
FIG. 2 is a schematic diagram illustrating a display device according to an embodiment of the disclosure, and a user.

FIG. 2 is a schematic diagram illustrating a display device according to an embodiment of the disclosure, and a user.

Referring to FIG. 2, an embodiment of the display device 1000 may include a display panel DP and a lens unit LN facing the display panel DP.

The display panel DP may display the first image IM1 to the user US. The display panel DP according to an embodiment of the disclosure may be a light emitting display panel, and is not particularly limited thereto. For example, the display panel DP may include an organic light emitting display panel, a quantum dot light emitting display panel, a micro light emitting diode (LED) light emitting display panel, or a nano LED light emitting display panel. A light emitting layer of the organic light emitting display panel may include an organic light emitting material. A light emitting layer of the quantum dot light emitting display panel may include quantum dots and quantum rods. A light emitting layer of the micro LED light emitting display panel may include a micro LED. A light emitting layer of the nano LED light emitting display panel may include a nano LED.

The display panel DP may include a plurality of pixels PX11, PX12, PX21, and PX22. The plurality of pixels PX11, PX12, PX21, and PX22 may be disposed in an active area AA. The display panel DP may generate the first image IM1.

The active area AA may be an area where the first image IM1 is displayed. The active area AA may include a first display area DA1 and a second display area DA2.

The first display area DA1 may display a part of the first image IM1 provided to the left eye of the user US.

The second display area DA2 may display a part of the first image IM1 provided to the right eye of the user US.

The plurality of pixels PX11, PX12, PX21, and PX22 may include the first pixel PX11 and the second pixel PX21 which are disposed in the first display area DA1, and the third pixel PX12 and the fourth pixel PX22 which are disposed in the second display area DA2.

The first pixel PX11 may be disposed in a central area of the first display area DA1. The central area may be a relatively high visibility area.

The second pixel PX21 may be disposed to be spaced apart from the central area of the first display area DA1 by a preset distance. For example, the second pixel PX21 may be disposed in a peripheral area of the first display area DA1 excluding the central area of the first display area DA1.

The display panel DP may display the first image IM1 in which the first luminance of the first pixel PX11 is less than the second luminance of the second pixel PX21 with respect to a same luminance value. Herein, the luminance value means a luminance value (or grayscale value) for each pixel in an image signal (e.g., image signal RGB shown in FIG. 4).

The third pixel PX12 may be disposed in the central area of the second display area DA2.

The fourth pixel PX22 may be disposed to be spaced apart from the central area of the second display area DA2 by a preset distance. For example, the fourth pixel PX22 may be disposed in a peripheral area of the first display area DA2 excluding the central area of the first display area DA2.

The display panel DP may display the first image IM1 in which the third luminance of the third pixel PX12 is less than the fourth luminance of the fourth pixel PX22 with respect to a same luminance value.

The lens unit LN may be disposed between the display panel DP and the user US.

The lens unit LN may refract the first image IM1 output from the display panel DP toward the eye of the user US. The lens unit LN may provide the second image IM2 to the user US. The second image IM2 may be provided by the first image IM1 provided from the display panel DP and passed through the lens unit LN.

By looking at the display panel DP through the lens unit LN, the user US may enjoy the same effect as viewing an image with a large screen at a specified distance. For example, the lens unit LN may enlarge the first image IM1 received from the display panel DP, may correct an optical error, and may provide the second image IM2 to the user US.

The lens unit LN according to an embodiment of the disclosure may include one or more optical elements. In an embodiment, for example, the optical element may include a diaphragm, a Fresnel lens, a convex lens, a concave lens, a filter, or a reflective surface.

In an embodiment, for example, the lens unit LN may include a pancake lens. The pancake lens may be composed of a relatively thin and small lens.

Magnification and focusing of the first image IM1 by the pancake lens may make the display panel DP physically smaller and lighter, and may allow the display panel to have more reduced power consumption than a relatively large display panel.

The magnification of the first image IM1 by the pancake lens may increase a field of view of the first image IM1. For example, the field of view of the first image IM1 may be provided using almost all of the field of view of the user US (e.g., a field of view of about 110 degrees).

Generally, the luminance of the image viewed by the user US may vary (or be differently changed) for each area according to the position between the user's eyes and the display panel DP by the lens unit LN. In detail, when viewing the display panel DP through the lens unit LN, the central area of the image may be relatively bright and an outer area may be relatively dark. Accordingly, the uniformity of luminance of the image perceived by the user US may be reduced. According to embodiments of the disclosure, the display panel DP may display the first image IM1, in which the first luminance of the first pixel PX11 is less than the second luminance of the second pixel PX21 and the third luminance of the third pixel PX12 is less than the fourth luminance of the fourth pixel PX22 with respect to a same luminance value, based on compensation data DATA (refer to FIG. 4) output from a driving controller 100 (refer to FIG. 4). In the second image IM2 passed through the lens unit LN, the luminance of each of the first and third pixels PX11 and PX12 having relatively low luminance which are disposed in the center area may be brightened or increased and the luminance of each of the second and fourth pixels PX21 and PX22 which are disposed in the periphery area may be darkened or decreased. Accordingly, luminance uniformity of the second image IM2 may be improved. Accordingly, the display device 1000 having improved display quality may be provided.

Figure 3A:
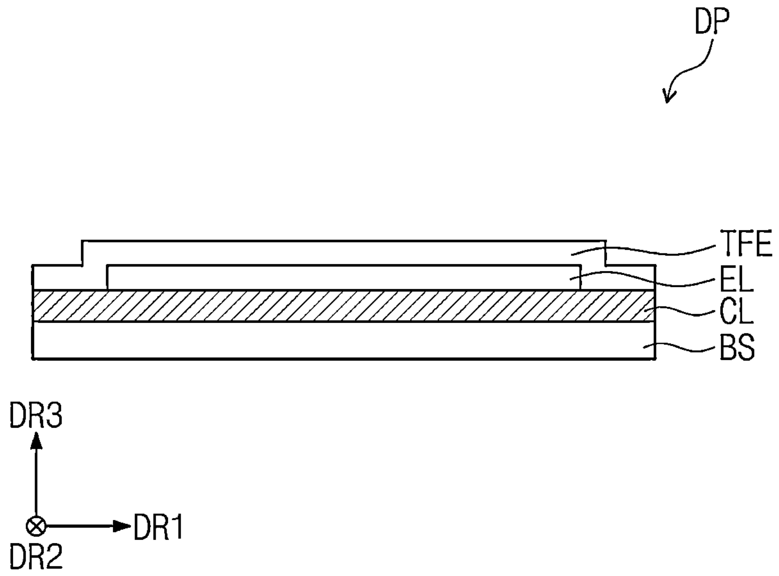
FIG. 3A is a cross-sectional view of a display panel, according to an embodiment of the disclosure.

FIG. 3A is a cross-sectional view of a display panel, according to an embodiment of the disclosure.

Referring to FIG. 3A, an embodiment of the display panel DP may include a base layer BS, a circuit layer CL, a light emitting element layer EL, and an encapsulation layer TFE.

The base layer BS may be a member providing a base surface on which the circuit layer CL is disposed. The base layer BS may be a glass substrate, a metal substrate, or a polymer substrate. However, the embodiment is not limited thereto, and the base layer BS may include an inorganic layer, an organic layer, or a composite material layer.

The circuit layer CL may be disposed on the base layer BS. The circuit layer CL may include an insulating layer, a semiconductor pattern, a conductive pattern, and a signal wire. An insulating layer, a semiconductor layer, and a conductive layer may be formed on the base layer BS by a method such as coating or deposition, and thereafter, the insulating layer, the semiconductor layer, and the conductive layer may be selectively patterned through a plurality of photolithography processes, such that the semiconductor pattern, the conductive pattern, and the signal wire included in the circuit layer CL may be formed.

The light emitting element layer EL may be disposed on the circuit layer CL. The light emitting element layer EL may include a light emitting element. For example, the light emitting element layer EL may include an organic light emitting material, an inorganic light emitting material, an organic-inorganic light emitting material, a quantum dot, a quantum rod, a micro LED, or a nano LED.

The encapsulation layer TFE may be disposed on the light emitting element layer EL. The encapsulation layer TFE may protect the light emitting element layer EL from foreign substances such as moisture, oxygen, and dust particles.

Figure 3B:
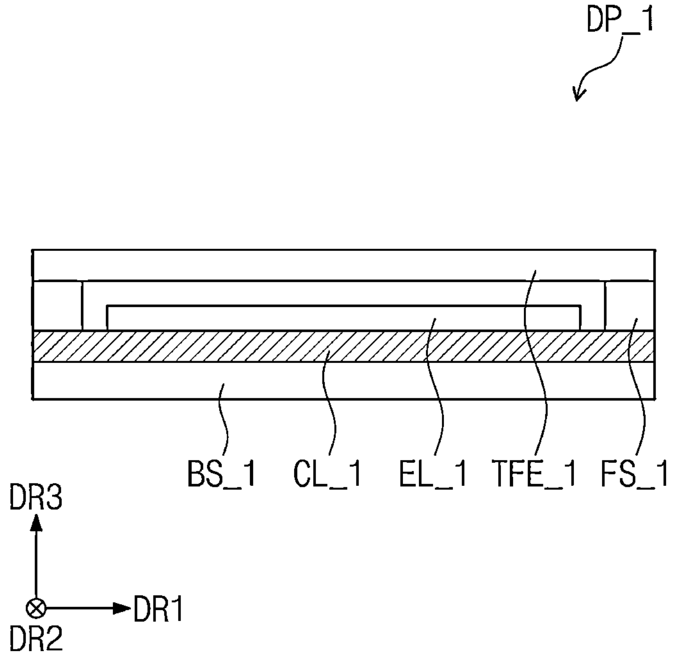
FIG. 3B is a cross-sectional view of a display panel, according to an alternative embodiment of the disclosure.

FIG. 3B is a cross-sectional view of a display panel, according to an alternative embodiment of the disclosure.

Referring to FIG. 3B, an embodiment of a display panel DP_1 may include a base layer BS_1, a circuit layer CL_1, a light emitting element layer EL_1, an encapsulation layerTFE_1, and a connecting member FS_1.

Each of the base layer BS_1 and the encapsulation layerTFE_1 may be a glass substrate, a metal substrate, or a polymer substrate, but is not particularly limited thereto.

The connecting member FS_1 may be disposed between the base layer BS_1 and the encapsulation layerTFE_1. The connecting member FS_1 may connect the encapsulation layerTFE_1 to the base layer BS_1 or the circuit layer CL_1. The connecting member FS_1 may include inorganic or organic materials. For example, the inorganic material may include a frit seal, and the organic material may include a photo-curable resin or a photo-plastic resin. However, the material constituting the connecting member FS_1 is not limited to the above examples.

Figure 4:
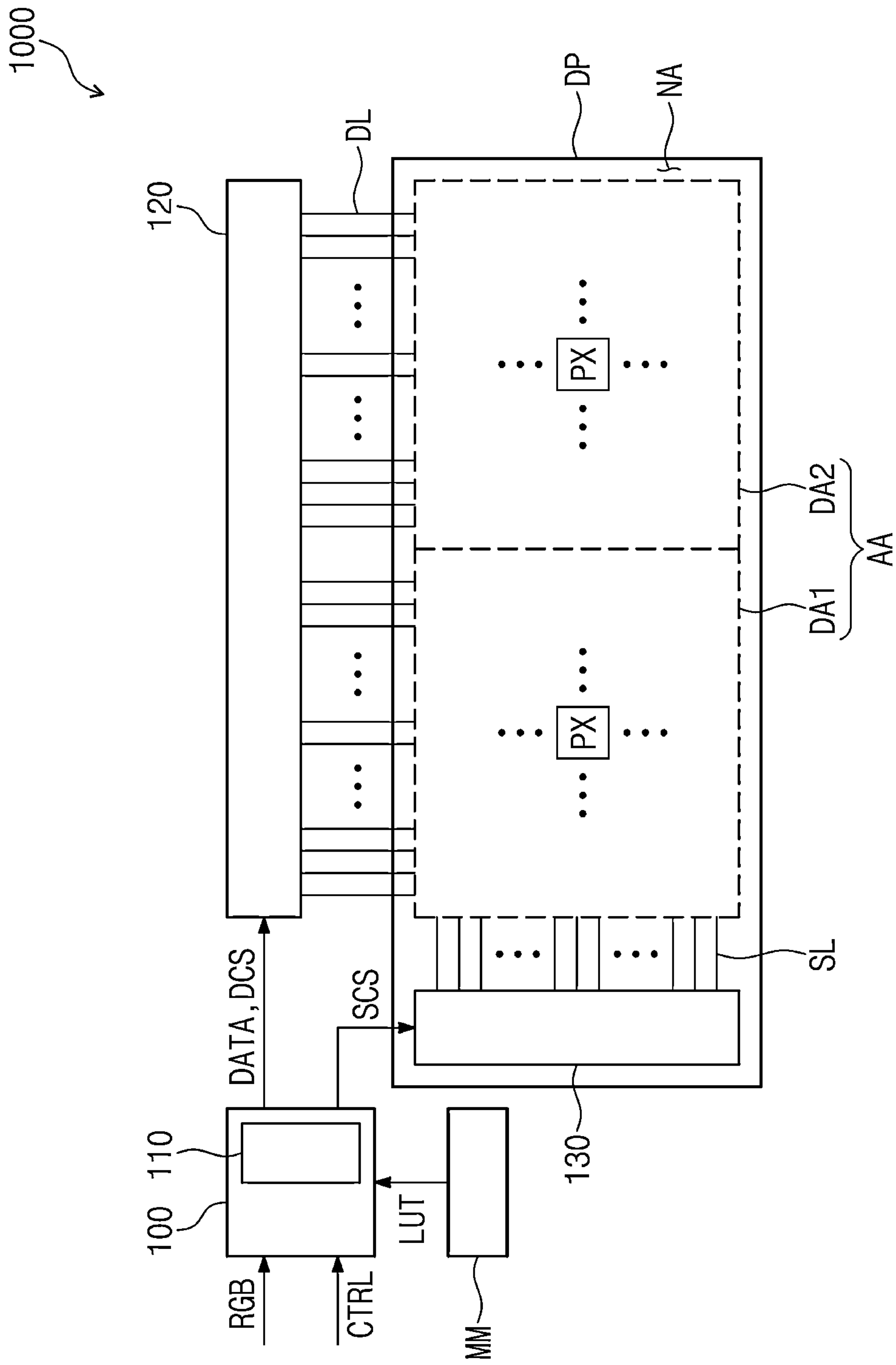
FIG. 4 is a block diagram illustrating a part of a display device, according to an embodiment of the disclosure.

FIG. 4 is a block diagram illustrating a part of a display device, according to an embodiment of the disclosure.

Referring to FIG. 4, an embodiment of the display device 1000 may include the driving controller 100, a data driver 120, a memory MM, and the display panel DP.

The driving controller 100 may receive an image signal RGB and a control signal CTRL from a main controller (e.g., a microcontroller). The driving controller 100 may convert the data format of the image signal RGB to meet interface specifications with the data driver 120.

The driving controller 100 may include a compensation unit 110. The compensation unit 110 may generate the compensation data DATA by compensating the converted image signal. This will be described later in greater detail.

The memory MM may provide a lookup table LUT to the driving controller 100.

The driving controller 100 may generate a scan control signal SCS and a data control signal DCS based on the control signal CTRL.

The data driver 120 may receive a data control signal DCS and the compensation data DATA from the driving controller 100. The data driver 120 may convert the compensation data DATA into data signals and may output the data signals to a plurality of data lines DL. The data signals may be analog voltages corresponding to grayscale values of the compensation data DATA.

The display panel DP may be electrically connected to the driving controller 100 and the data driver 120. The display panel DP may include a plurality of scan lines SL, the plurality of data lines DL, a scan driver 130, and the plurality of pixels PX.

The scan driver 130 may receive the scan control signal SCS from the driving controller 100. The scan driver 130 may output scan signals to the plurality of scan lines SL in response to the scan control signal SCS.

The active area AA and a non-active area NA may be defined in the display panel DP.

The plurality of pixels PX electrically connected to the plurality of scan lines SL and the plurality of data lines DL may be disposed in the active area AA. The plurality of pixels PX may be selected by scan signals supplied to the plurality of scan lines SL and may receive data signals from the plurality of data lines DL.

The non-active area NA may be adjacent to the active area AA. The non-active area NA may surround the active area AA. The scan driver 130 may be disposed in the non-active area NA.

The active area AA may include the first display area DA1 and the second display area DA2. The first display area DA1 and the second display area DA2 may be physically implemented as one panel. However, this is merely an example and the configuration of the first display area DA1 and the second display area DA2 according to an embodiment of the disclosure is not limited thereto. In an alternative embodiment, for example, the first display area DA1 and the second display area DA2 may be implemented as two physically separated panels and connected to the data driver 120 and the scan driver 130, respectively.

The first display area DA1 may display a preset image supplied to the left eye of the user US (refer to FIG. 2). Some of the plurality of pixels PX may be disposed in the first display area DA1.

The second display area DA2 may display a preset image supplied to the right eye of the user US (refer to FIG. 2). The rest of the plurality of pixels PX may be disposed in the second display area DA2.

The plurality of pixels PX may include a pixel disposed in the central area of each of the first and second display areas DA1 and DA2 and a pixel disposed in the peripheral area spaced apart from the central area by a preset distance.

The compensation unit 110 may calculate a compensation value of a pixel based on a lookup table LUT provided with a compensation value for each preset distance. The compensation unit 110 may output the compensation data DATA for controlling the luminance of the first image IM1 (refer to FIG. 2) based on image data IMD (refer to FIG. 5) converted from the image signal RGB and the compensation value. This will be described later in greater detail.

The display panel DP may display the first image IM1 (refer to FIG. 2), in which the first luminance of the pixel in the central area is less than the second luminance of the pixel in the peripheral area with respect to a same luminance value, based on the compensation data DATA.

According to embodiments of the disclosure, the display panel DP may output the compensated first image IM1 (refer to FIG. 2). The first image IM1 (refer to FIG. 2) may pass through the lens unit LN (refer to FIG. 2) and may be displayed as the second image IM2. In the first image IM1 (refer to FIG. 2), the luminance of the pixels with relatively low luminance disposed in the central area may be brightened in the second image IM2 by the lens unit LN (refer to FIG. 2). In the first image IM1 (refer to FIG. 2), the luminance of the pixels with relatively high luminance disposed in the peripheral area may be darkened in the second image IM2 by the lens unit LN (refer to FIG. 2). Accordingly, luminance uniformity of the second image IM2 may be improved. In detail, the luminance uniformity of the second image IM2 perceived by the user US (refer to FIG. 2) may be improved. Accordingly, the display device 1000 having improved display quality may be provided.

Figure 5:
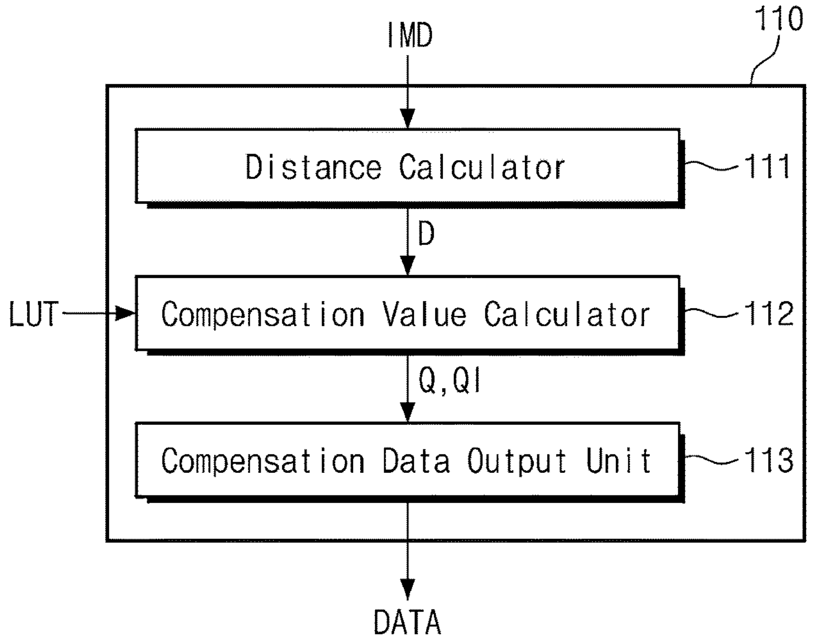
FIG. 5 is a block diagram illustrating a compensation unit, according to an embodiment of the disclosure.

FIG. 5 is a block diagram illustrating a compensation unit, according to an embodiment of the disclosure.

Referring to FIGS. 4 and 5, an embodiment of the compensation unit 110 may include a distance calculator 111, a compensation value calculator 112, and a compensation data output unit 113.

The distance calculator 111 may receive the image data IMD obtained by converting the image signal RGB from the driving controller 100. The image data IMD may be data corresponding to one of the plurality of pixels PX.

The distance calculator 111 may calculate a distance value 'D' between two coordinates. The distance calculator 111 may calculate the distance value 'D' from preset center coordinates of the first display area DA1 or the second display area DA2 based on the coordinates of the image data IMD. For example, the distance calculator 111 may calculate the preset distance between the pixels PX11 and PX12 (refer to FIG. 2) disposed in the center area and the pixels PX21 and PX22 (refer to FIG. 2) spaced apart by a preset distance from the center area as the distance value 'D'.

The distance value 'D' may be the shortest distance between the coordinates and the center coordinates. For example, when the coordinates of the image data IMD and the center coordinates are the same as each other, the distance value 'D' may have a value of '0'.

The distance calculator 111 may output the distance value 'D' to the compensation value calculator 112.

The compensation value calculator 112 may receive the distance value 'D' from the distance calculator 111. The compensation value calculator 112 may receive the lookup table LUT from the memory MM.

The compensation value calculator 112 may output a compensation value QI and an interpolation compensation value 'Q' using the lookup table LUT and the distance value 'D'.

TABLE 1

| | | | | | | |
|---|---|---|---|---|---|---|
| Distance value D | $D_0$ | $D_1$ | $D_2$ | $D_3$ | $D_4$ | $D_5$ |
| Compensation value QI | $Q_0$ | $Q_1$ | $Q_2$ | $Q_3$ | $Q_4$ | $Q_5$ |

Table 1 may be the lookup table LUT according to an embodiment of the disclosure. Table 1 illustrates five distance values 'D' and five compensation values QI respectively corresponding to the plurality of distance values 'D', as an example. However, this is an example, and the number of the plurality of distance values 'D' according to an embodiment of the disclosure is not limited thereto and may be provided in various ways. The plurality of compensation values QI may also be provided in a preset number corresponding to the number of the plurality of distance values 'D'.

In an embodiment, the plurality of compensation values QI may be provided, and the plurality of distance values 'D' may be provided. In an embodiment, a plurality of distance values $D_0$, $D_1$, $D_2$, $D_3$, $D_4$, and $D_5$ and a plurality of compensation values $Q_0$, $Q_1$, $Q_2$, $Q_3$, $Q_4$, and $Q_5$ may be provided in the lookup table LUT. The plurality of compensation values $Q_0$, $Q_1$, $Q_2$, $Q_3$, $Q_4$, and $Q_5$ may include a first compensation value $Q_0$, a second compensation value $Q_1$, a third compensation value $Q_2$, a fourth compensation value $Q_3$, a fifth compensation value $Q_4$, and a sixth compensation value $Q_5$. The plurality of distance values $D_0$, $D_1$, $D_2$, $D_3$, $D_4$, and $D_5$ may include a first distance value $D_0$, a second distance value $D_1$, a third distance value $D_2$, a fourth distance value $D_3$, a fifth distance value $D_4$, and a sixth distance value $D_5$.

The plurality of compensation values $Q_0$, $Q_1$, $Q_2$, $Q_3$, $Q_4$, and $Q_5$ may correspond to the plurality of distance values $D_0$, $D_1$, $D_2$, $D_3$, $D_4$, and $D_5$, respectively. In detail, the first compensation value $Q_0$ may correspond to the first distance value $D_0$. The second compensation value $Q_1$ may correspond to the second distance value $D_1$. The third compensation value $Q_2$ may correspond to the third distance value $D_2$. The fourth compensation value $Q_3$ may correspond to the fourth distance value $D_3$. The fifth compensation value $Q_4$ may correspond to the fifth distance value $D_4$. The sixth compensation value $Q_5$ may correspond to the sixth distance value $D_5$.

The plurality of distance values $D_0$, $D_1$, $D_2$, $D_3$, $D_4$, and $D_5$ may be an arithmetic sequence having a tolerance. In detail, a difference between the second distance value $D_1$ and the first distance value Do may be the same as the tolerance. A difference between the third distance value $D_2$ and the second distance value $D_1$ may be the same as the tolerance. A difference between the fourth distance value $D_3$ and the third distance value $D_2$ may be the same as the tolerance. A difference between the fifth distance value $D_4$ and the fourth distance value $D_3$ may be the same as the tolerance. A difference between the sixth distance value $D_5$ and the fifth distance value $D_4$ may be the same as the tolerance.

The plurality of compensation values $Q_0$, $Q_1$, $Q_2$, $Q_3$, $Q_4$, and $Q_5$ may increase as the plurality of distance values $D_0$, $D_1$, $D_2$, $D_3$, $D_4$, and $D_5$ increase. For example, the first compensation value $Q_0$ may be '1', the second compensation value $Q_1$ may be 1.04, the third compensation value $Q_2$ may be 1.32, the fourth compensation value $Q_3$ may be 2.08, the fifth compensation value $Q_4$ may be 3.56, and the sixth compensation value $Q_5$ may be '6'. However, this is merely an example and the compensation value QI according to an embodiment of the disclosure is not limited thereto.

The compensation value calculator 112 may calculate the compensation value QI and the interpolation compensation value 'Q' using the lookup table LUT and the distance value 'D'.

The compensation value calculator 112 may output the compensation value QI of the corresponding distance value 'D' when the distance value 'D' received from the distance calculator 111 corresponds to one of the plurality of distance values $D_0$, $D_1$, $D_2$, $D_3$, $D_4$, and $D_5$ of the lookup table LUT.

The compensation value calculator 112 may calculate the interpolation compensation value 'Q' using the interpolation method when the distance value 'D' received from the distance calculator 111 does not correspond to one of the plurality of distance values $D_0$, $D_1$, $D_2$, $D_3$, $D_4$, and $D_5$ of the lookup table LUT. This will be described later in greater detail.

According to an embodiment of the disclosure, the lookup table LUT may be variously stored in the memory MM according to circumstances. In a case where the lens unit LN (refer to FIG. 2) is replaced, the compensation value QI for compensating optical characteristics of the lens unit LN (refer to FIG. 2) may vary. The lookup table LUT may be set according to the lens unit LN (refer to FIG. 2) and may be stored in the memory MM. The lookup table LUT according to the lens unit LN (refer to FIG. 2) may be provided in the memory MM. In detail, in the display device 1000, even if the lens unit LN (refer to FIG. 2) is replaced, the first image IM1 (refer to FIG. 2) may be easily compensated without a separate additional configuration. Accordingly, the driving controller 100 having improved reliability and the display device 1000 including the driving controller 100 may be provided.

In addition, according to an embodiment of the disclosure, the compensation value QI in the lookup table LUT may be set based on the distance value 'D' from a center point. The lookup table LUT may be configured with a low capacity compared to the case where compensation values are stored for all pixels. In such an embodiment, the memory MM in which the lookup table LUT is stored may not require a large capacity.

The compensation value calculator 112 may output the compensation value QI and the interpolation compensation value 'Q' to the compensation data output unit 113.

The compensation data output unit 113 may receive the compensation value QI and the interpolation compensation value 'Q' from the compensation value calculator 112.

The compensation data output unit 113 may output the compensation data DATA based on the compensation value QI, the interpolation compensation value 'Q', and the image data IMD.

The compensation data output unit 113 may multiply the compensation value QI corresponding to the image data IMD of each of the plurality of pixels PX or the interpolation compensation value 'Q' by the image data IMD to obtain the compensation data DATA.

Figure 6:
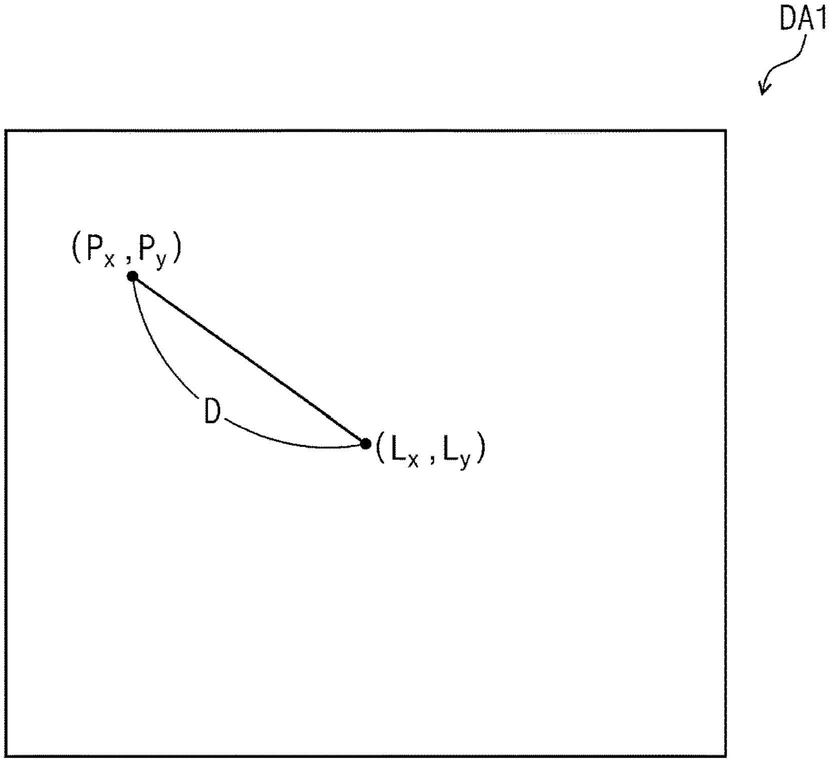
FIG. 6 illustrates a first display area to describe an operation of a distance calculator, according to an embodiment of the disclosure.

FIG. 6 illustrates a first display area to describe an operation of a distance calculator, according to an embodiment of the disclosure.

Referring to FIGS. 5 and 6, the distance calculator 111 may calculate the distance value 'D' based on preset center coordinates $L_x$ and $L_y$ of the first display area DA1 and pixel coordinates $P_x$ and $P_y$ of one of the plurality of pixels PX. The pixel coordinates $P_x$ and $P_y$ may be included in the image data IMD.

In an embodiment, the distance calculator 111 may calculate the distance value 'D' based on Equation 1 below.

$$D = \sqrt{(L_x - P_x)^2 + (L_y - P_y)^2} \quad \text{[Equation 1]}$$

In Equation 1, the distance value 'D' may be denoted by 'D', the 'x' value of a center coordinate may be denoted by $L_x$, the 'y' value of the center coordinate may be denoted by $L_y$, the 'x' value of the pixel coordinate may be denoted by $P_x$, and the 'y' value of the pixel coordinate may be denoted by $P_y$.

In an embodiment where calculating the distance value 'D' based on (or using) Equation 1, the distance calculator 111 may calculate an accurate distance between two coordinates as the distance value 'D'.

Alternatively, the distance calculator 111 may calculate the distance value 'D' based on Equation 2 below.

$$D = (L_x - P_x)^2 + (L_y - P_y)^2 \quad \text{[Equation 2]}$$

In Equation 2, the distance value 'D' may be denoted by 'D', the 'x' value of a center coordinate may be denoted by $L_x$, the 'y' value of the center coordinate may be denoted by $L_y$, the 'x' value of the pixel coordinate may be denoted by $P_x$, and the 'y' value of the pixel coordinate may be denoted by $P_y$.

In an embodiment where the distance calculator 111 calculates the distance value 'D' based on (or using) Equation 2, the square root calculation may be omitted. Computational complexity of the distance calculator 111 may be reduced. As a result, a load applied to the distance calculator 111 may be reduced. However, this is merely an example, and the method for calculating the distance value 'D' by the distance calculator 111 according to an embodiment of the disclosure is not limited to Equation 1 or Equation 2, and may proceed through various equations.

In such an embodiment, the operation of the distance calculator 111 in the second display area DA is the same as the operation of the distance calculator 111 in the first display area DA1 with reference to FIG. 6, and any repetitive detailed description thereof will be omitted.

Figure 7A:
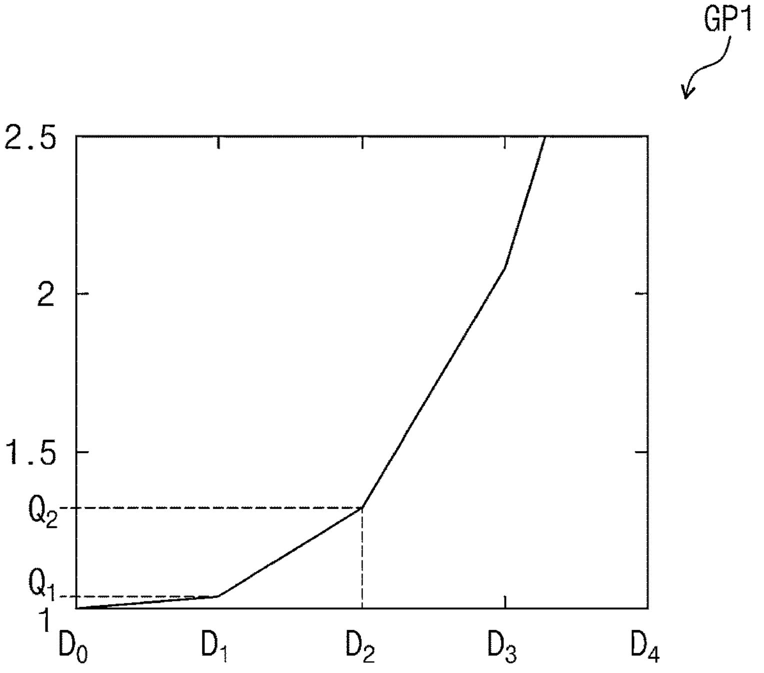
FIG. 7A is a graph illustrating compensation values and interpolation compensation values to describe an operation of a compensation value calculator, according to an embodiment of the disclosure.

FIG. 7A is a graph illustrating compensation values and interpolation compensation values to describe an operation of a compensation value calculator, according to an embodiment of the disclosure.

Referring to FIG. 5, Table 1, and FIG. 7A, the compensation value calculator 112 may calculate the interpolation compensation value 'Q' using the interpolation method when the distance value 'D' calculated by the distance calculator 111 does not correspond to one of the plurality of distance values $D_0$, $D_1$, $D_2$, $D_3$, $D_4$, and $D_5$ of the lookup table LUT.

According to an embodiment, the interpolation method may include a linear interpolation method.

In an embodiment, the compensation value calculator 112 may use Equation 3 to perform the linear interpolation method.

$$Q = Q_1 * \frac{D_2 - D}{D_2 - D_1} + Q_2 * \frac{D - D_1}{D_2 - D_1} \quad \text{[Equation 3]}$$

The compensation value calculator 112 may calculate the interpolation compensation value 'Q' using Equation 3. In Equation 3, the case where the distance value 'D' is a value existing between the second distance value $D_1$ and the third distance value $D_2$ is indicated as an example. In detail, Equation 3 may be an interpolation method when the distance value 'D' is greater than the second distance value $D_1$ and less than the third distance value $D_2$.

In Equation 3, the distance value 'D' is denoted by 'D', the interpolation compensation value 'Q' is denoted by 'Q', the second distance value $D_1$ is denoted by $D_1$, the third distance value $D_2$ is denoted by $D_2$, the second compensation value $Q_1$ is denoted by $Q_1$, and the third compensation value $Q_2$ is denoted by $Q_2$.

A first graph GP1 shown in FIG. 7A may illustrate the compensation value QI according to the distance value 'D' and the interpolation compensation value 'Q' calculated using the linear interpolation method. In detail, the x-axis of the first graph GP1 may represent the distance value 'D', and the y-axis of the first graph GP1 may represent the compensation value QI and the interpolation compensation value 'Q'.

The compensation data output unit 113 may multiply the compensation value QI corresponding to the image data IMD of each of the plurality of pixels PX or the interpolation compensation value 'Q' by the image data IMD to obtain the compensation data DATA.

Figure 7B:
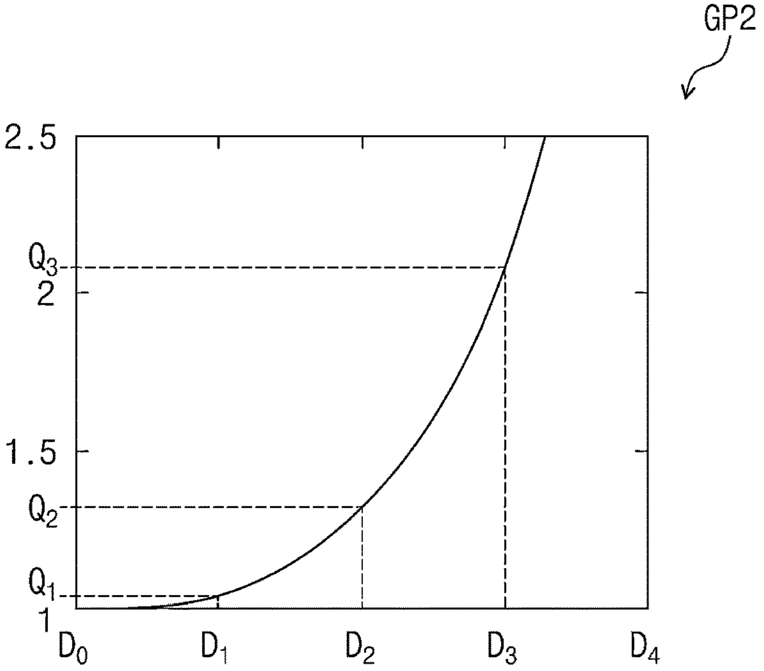
FIG. 7B is a graph illustrating compensation values and interpolation compensation values to describe an operation of a compensation value calculator, according to an embodiment of the disclosure.

FIG. 7B is a graph illustrating compensation values and interpolation compensation values to describe an operation of a compensation value calculator, according to an embodiment of the disclosure.

Referring to FIG. 5, Table 1, and FIG. 7B, the compensation value calculator 112 may calculate the interpolation compensation value 'Q' using the interpolation method when the distance value 'D' calculated by the distance calculator 111 does not correspond to one of the plurality of distance values $D_0$, $D_1$, $D_2$, $D_3$, $D_4$, and $D_5$ of the lookup table LUT.

The interpolation method may include a Lagrange interpolation method.

The Lagrange interpolation method may be expressed as Equation 4.

$$Q = Q_1 * \frac{D - D_2}{D_1 - D_2} * \frac{D - D_3}{D_1 - D_2} + Q_2 * \frac{D - D_1}{D_2 - D_1} * \frac{D - D_3}{D_2 - D_3} + Q_3 * \frac{D - D_1}{D_3 - D_1} * \frac{D - D_2}{D_3 - D_2} \quad \text{[Equation 4]}$$

In Equation 4, the case where the distance value 'D' is a value existing between the second distance value $D_1$ and the third distance value $D_2$ is indicated as an example. In detail, Equation 4 may be an interpolation method when the distance value 'D' is greater than the second distance value $D_1$ and less than the third distance value $D_2$.

In Equation 4, the distance value 'D' is denoted by 'D', the interpolation compensation value 'Q' is denoted by 'Q', the second distance value $D_1$ is $D_1$, the third distance value $D_2$ is denoted by $D_2$, the fourth distance value $D_3$ is $D_3$, the second compensation value $Q_1$ is denoted by $Q_1$, the third compensation value $Q_2$ is denoted by $Q_2$, and the fourth compensation value $Q_3$ is denoted by $Q_3$.

In this case, the second distance value $D_1$, the third distance value $D_2$, and the fourth distance value D3 are constants, and a relationship of $D_1<D_2<D_3$ may be established between the second distance value $D_1$, the third distance value $D_2$, and the fourth distance value $D_3$. Therefore, Equation 4 may be converted to Equation 5 as follows.

$$Q = Q_1 * \frac{D_2 - D}{D_2 - D_1} * \frac{D_3 - D}{D_3 - D_1} + Q_2 * \frac{D - D_1}{D_2 - D_1} * \frac{D_3 - D}{D_3 - D_2} + Q_3 * \frac{D - D_1}{D_3 - D_1} * \frac{D - D_2}{D_3 - D_2} \quad \text{[Equation 5]}$$

In Equation 5, the plurality of distance values $D_0$, $D_1$, $D_2$, $D_3$, $D_4$, and $D_5$ may be an arithmetic sequence having a tolerance. When the tolerance is denoted by 'd', Equation 5 may be converted to Equation 6 as follows.

$$Q = Q_1 * \frac{D_2 - D}{d} * \frac{D_3 - D}{2d} + Q_2 * \frac{D - D_1}{d} * \frac{D_3 - D}{d} + Q_3 * \frac{D - D_1}{2d} * \frac{D - D_2}{d} \quad \text{[Equation 6]}$$

That is, the compensation value calculator 112 may use Equation 6.

A second graph GP2 may illustrate the compensation value QI according to the distance value 'D' and the interpolation compensation value 'Q' calculated using the Lagrange interpolation method. In detail, the x-axis of the second graph GP2 may represent the distance value 'D', and the y-axis of the second graph GP2 may represent the compensation value QI and the interpolation compensation value 'Q'.

The compensation data output unit 113 may multiply the compensation value QI corresponding to the image data IMD of each of the plurality of pixels PX or the interpolation compensation value 'Q' by the image data IMD to obtain the compensation data DATA.

According to an embodiment of the disclosure, the second graph GP2 may be expressed as a quadratic equation using the Lagrange interpolation method. That is, the second graph GP2 may have a curved shape. As a result, an inflection point may not be generated in the second graph GP2. The compensation data output unit 113 may output the compensation data DATA using the compensation value QI and the interpolation compensation value 'Q' calculated by using the lookup table LUT and the second graph GP2. In the first image IM1 (refer to FIG. 2) generated based on the compensation data DATA, a luminance step caused by an inflection point may not be perceived. Accordingly, it is possible to provide the display device 1000 with improved display quality.

The tolerance according to an embodiment of the disclosure may be provided as an n-th power of two, where 'n' is a natural number. That is, the tolerance may be 2, 4, 8, 16, 32, 64, 128, 256, etc. In such an embodiment according to the disclosure, in applying Equation 6, the compensation value calculator 112 may perform a division operation using a shift operator. Accordingly, computational complexity of the compensation value calculator 112 may be reduced. As a result, a load applied to the compensation value calculator 112 may be reduced. A register transfer level (RTL) design of the compensation value calculator 112 may be facilitated. Accordingly, the driving controller 100 having improved reliability and the display device 1000 including the driving controller 100 may be provided.

Figure 8:
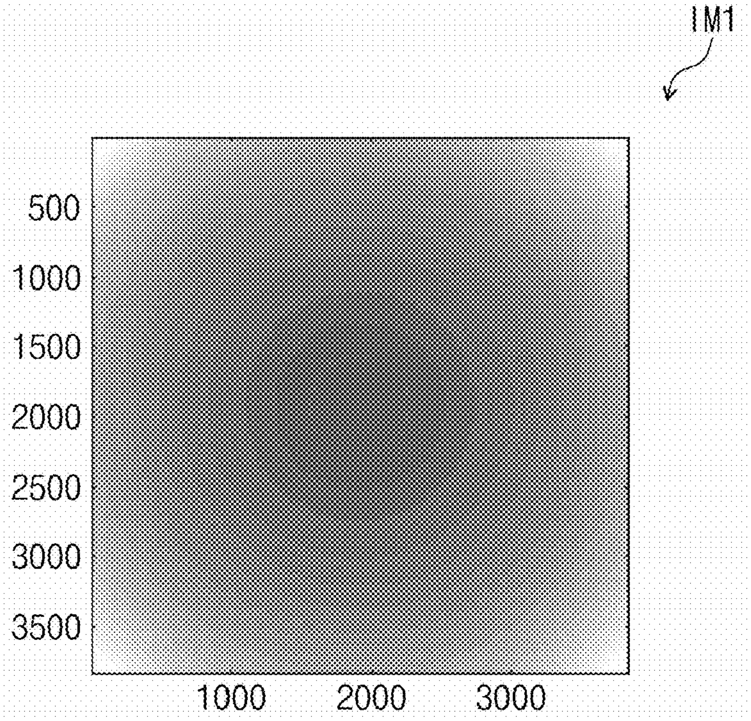
FIG. 8 illustrates a first image, according to an embodiment of the disclosure.
Figure 9:
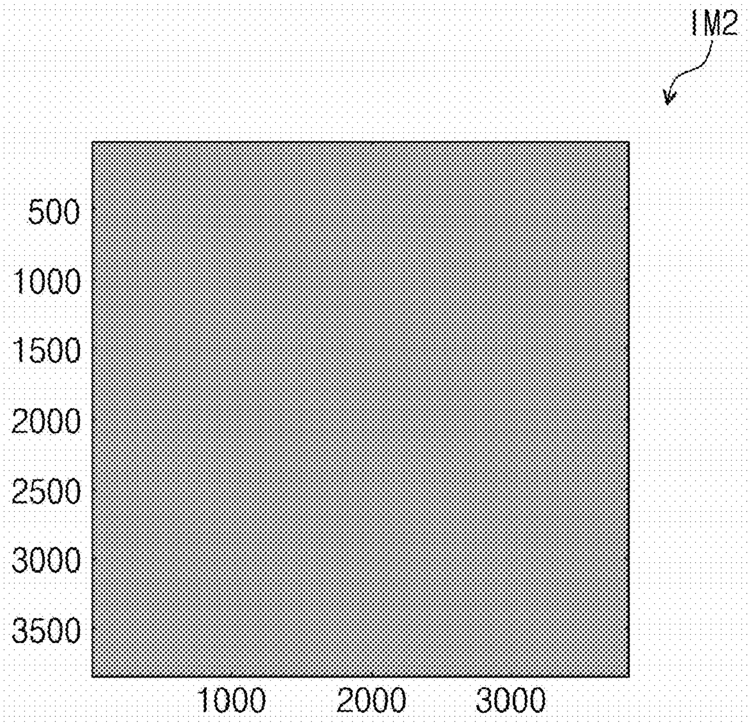
FIG. 9 illustrates a second image, according to an embodiment of the disclosure.

FIG. 8 illustrates a first image according to an embodiment of the disclosure, and FIG. 9 illustrates a second image according to an embodiment of the disclosure.

Referring to FIGS. 2, 5, 8, and 9, the display device 1000 may include the display panel DP, the driving controller 100, and the lens unit LN.

The driving controller 100 may receive the image signal RGB and may drive the display panel DP.

The driving controller 100 may include the compensation unit 110. The compensation unit 110 may include the distance calculator 111, the compensation value calculator 112, and the compensation data output unit 113.

In FIGS. 8 and 9, a vertical axis may indicate the y-axis coordinate of each pixel in units of 500. Although y-axis coordinate of 500 to 3500 are illustratively illustrated in FIGS. 8 and 9, the y-axis coordinate according to an embodiment of the disclosure is not limited thereto.

In FIGS. 8 and 9, a horizontal axis may indicate the x-axis coordinate of each of the plurality of pixels PX in units of 1000. Although the x-axis coordinate of 1000 to 3000 are illustratively illustrated in FIGS. 8 and 9, the x-axis coordinate according to an embodiment of the disclosure is not limited thereto.

The distance calculator 111 may calculate the distance value 'D' between two coordinates. The distance calculator 111 may calculate the distance value 'D' between the preset center coordinates $L_x$ and $L_y$(refer to FIG. 6) and the pixel coordinates $P_x$ and $P_y$ (refer to FIG. 6) for which luminance is to be compensated. For example, the preset center coordinates $L_x$ and $L_y$(refer to FIG. 6) may have coordinates of 2000 and 2000.

The compensation value calculator 112 may output the compensation value QI of each of the plurality of pixels PX based on the lookup table LUT, or may calculate the interpolation compensation value 'Q' based on the distance value 'D' and the compensation value QI.

The compensation data output unit 113 may multiply the compensation value QI corresponding to the image data IMD of each of the plurality of pixels PX converted from the image signal RGB or the interpolation compensation value 'Q' by the image data IMD to calculate the compensation data DATA.

The plurality of pixels PX may be selected by scan signals supplied to the plurality of scan lines SL and may receive data signals from the plurality of data lines DL. Through this, the display panel DP may display the first image IM1.

FIG. 8 may indicate that the first image IM1 is displayed in gray scale.

The display panel DP may display the first image IM1 in which first luminance of the pixel disposed at the center coordinates $L_x$ and $L_y$ (refer to FIG. 6) is less than second luminance of the pixel disposed at coordinates away from the center coordinates $L_x$ and $L_y$ (refer to FIG. 6), based on the compensation data DATA.

The first image IM1 may pass through the lens unit LN and may be converted into the second image IM2. The second image IM2 may be an image actually provided to the user US.

FIG. 9 may indicate that the second image IM2 is displayed in gray scale.

According to an embodiment of the disclosure, the compensation unit 110 may compensate for a decrease in light quantity by position caused by the lens unit LN. Luminance of the pixel having a relatively low luminance disposed in the central area of the first image IM1 by the compensation unit 110 may be brightened in the second image IM2 by the lens unit LN. Luminance of the pixel having a relatively high luminance disposed in the peripheral area of the first image IM1 by the compensation unit 110 may be darkened in the second image IM2 by the lens unit LN. Accordingly, luminance uniformity of the second image IM2 may be improved. In detail, the luminance uniformity of the second image IM2 perceived by the user US (refer to FIG. 2) may be improved. Accordingly, it is possible to provide the display device 1000 with improved display quality.

According to an embodiment of the disclosure, a compensation unit may compensate for a decrease in light quantity by position due to a lens unit. A display panel may output a compensated first image by using the compensation unit. A pixel having relatively low luminance disposed in the central area of the first image may have a high luminance in the second image by the lens unit. A pixel having relatively high luminance disposed in the peripheral area of the first image may have a low luminance in the second image by the lens unit. Accordingly, luminance uniformity of the second image may be improved. In detail, the luminance uniformity of the second image perceived by a user may be improved. Accordingly, it is possible to provide a drive controller with improved display quality and a display device including the same.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a plurality of pixels, wherein the display panel displays an image in a display area; and a driving controller which receives an image signal and drives the plurality of pixels, wherein the driving controller includes a compensation unit, and wherein the plurality of pixels include a first pixel disposed in a central area of the display area and a second pixel spaced apart from the central area by a preset distance, wherein the compensation unit outputs compensation data for controlling luminance of the image, wherein the display panel displays the image based on the compensation data, and wherein the compensation data controls a first luminance of the first pixel to be less than a second luminance of the second pixel with respect to a same luminance value based on the preset distance.

2. The display device of claim 1, further comprising:

a lens unit facing the display panel, wherein the image is provided to a user through the lens unit.

3. The display device of claim 2, wherein the lens unit includes a pancake lens.

4. The display device of claim 1, wherein the compensation unit includes:

a distance calculator which calculates a distance value between two pixel coordinates;

a compensation value calculator which outputs a compensation value for each of the plurality of pixels based on a lookup table provided with a compensation value for each distance value; and a compensation data output unit which outputs the compensation data based on image data, which is obtained by converting the image signal, and the compensation value.

5. The display device of claim 4, further comprising:

a memory in which the lookup table is stored.

6. The display device of claim 4, wherein the distance calculator calculates the distance value based on preset center coordinates of the display area and pixel coordinates of one of the plurality of pixels.

7. The display device of claim 6, wherein the distance calculator calculates the distance value based on the following equation:

$$D=\sqrt{(L_x-P_x)^2+(L_y-P_y)^2},$$

wherein the distance value is denoted by D, the center coordinates are denoted by Lx and Ly, and the pixel coordinates are denoted by Px and Py.

8. The display device of claim 6, wherein the distance calculator calculates the distance value based on the following equation:

$$D=(L_x-P_x)^2+(L_y-P_y)^2,$$

wherein the distance value is denoted by D, the center coordinates are denoted by Lx and Ly, and the pixel coordinates are denoted by Px and Py.

9. The display device of claim 4, wherein the compensation value is provided in plurality, and the distance value is provided in plurality, wherein a plurality of distance values and a plurality of compensation values respectively corresponding to the plurality of distance values are included in the lookup table, wherein the plurality of distance values is an arithmetic sequence with a tolerance, and wherein the plurality of compensation values increase as the plurality of distance values increase.

10. The display device of claim 9, wherein, when the distance value calculated by the distance calculator does not correspond to one of the plurality of distance values in the lookup table, the compensation value calculator calculates an interpolation compensation value using an interpolation method.

11. The display device of claim 10, wherein the interpolation method includes a linear interpolation method.

12. The display device of claim 11, wherein the linear interpolation method calculates the interpolation compensation value based on the following equation:

$$Q=Q_1*\frac{D_2-D}{D_2-D_1}+Q_2*\frac{D-D_1}{D_2-D_1},$$

wherein the distance value calculated by the distance calculator is 'D', the interpolation compensation value is denoted by 'Q', a first distance value less than the distance value calculated by the distance calculator among the plurality of distance values is denoted by D1, a second distance value greater than the distance value calculated by the distance calculator among the plurality of distance values is denoted by D2, a first compensation value of the first distance value is denoted by Q1, and a second compensation value of the second distance value is denoted by Q2.

13. The display device of claim 10, wherein the interpolation method includes a Lagrange interpolation method.

14. The display device of claim 13, wherein the Lagrange interpolation method calculates the interpolation compensation value based on the following equation:

$$Q = Q_1 * \frac{D_2 - D}{d} * \frac{D_3 - D}{2d} + Q_2 * \frac{D - D_1}{d} * \frac{D_3 - D}{d} + Q_3 * \frac{D - D_1}{2d} * \frac{D - D_2}{d},$$

wherein the distance value calculated by the distance calculator is 'D', the interpolation compensation value is denoted by 'Q', a first distance value, which is one of the plurality of distance values, is denoted by D1, a second distance value, which is another one of the plurality of distance values, is denoted by D2, a third distance value, which is another one of the plurality of distance values, is denoted by D3, a first compensation value of the first distance value is denoted by Q1, a second compensation value of the second distance value is denoted by Q2, a third compensation value of the third distance value is denoted by Q3, and the tolerance is 'd'.

15. The display device of claim 9, wherein the tolerance is an n-th power of two, wherein 'n' is a natural number.

16. The display device of claim 10, wherein the compensation data output unit calculates the compensation data by multiplying the compensation value corresponding to the image data of each of the plurality of pixels or the interpolation compensation value by the image data.

17. A driving controller for receiving an image signal and driving a plurality of pixels of a display panel, the driving controller comprising:

a compensation unit, and wherein the compensation unit includes:

a distance calculator which calculates a distance value between two pixel coordinates;

a compensation value calculator which outputs a compensation value for each of the plurality of pixels based on a lookup table provided with a compensation value for each distance value; and a compensation data output unit which outputs compensation data based on image data, which is obtained by converting the image signal, and the compensation value, wherein the compensation data controls a first luminance of a first pixel disposed in a central area of a display area of the display panel to be less than a second luminance of a second pixel spaced apart from the central area by a preset distance with respect to a same luminance value based on the preset distance.

18. The driving controller of claim 17, wherein the distance calculator calculates the distance value based on preset center coordinates and pixel coordinates of one of the plurality of pixels.

19. The driving controller of claim 18, wherein the compensation value is provided in plurality, and the distance value is provided in plurality, wherein a plurality of distance values and a plurality of compensation values respectively corresponding to the plurality of distance values are included in the lookup table, wherein the plurality of distance values is an arithmetic sequence with a tolerance, and wherein the plurality of compensation values increase as the plurality of distance values increase.

20. The driving controller of claim 19, wherein, when the distance value calculated by the distance calculator does not correspond to one of the plurality of distance values in the lookup table, the compensation value calculator calculates an interpolation compensation value using an interpolation method, and wherein the compensation data output unit calculates the compensation data by multiplying the compensation value corresponding to the image data of each of the plurality of pixels or the interpolation compensation value by the image data.

* * * * *